United States Patent
Xu et al.

(10) Patent No.: US 12,309,798 B2
(45) Date of Patent: May 20, 2025

(54) TRANSMISSION OF UPLINK DATA AT START OF FIXED FRAME PERIOD IN FRAME BASED EQUIPMENT MODE

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 17/759,466

(22) PCT Filed: Feb. 13, 2020

(86) PCT No.: PCT/CN2020/075017
§ 371 (c)(1),
(2) Date: Jul. 26, 2022

(87) PCT Pub. No.: WO2021/159370
PCT Pub. Date: Aug. 19, 2021

(65) Prior Publication Data
US 2023/0055275 A1 Feb. 23, 2023

(51) Int. Cl.
*H04W 72/23* (2023.01)
*H04W 74/08* (2024.01)
*H04W 74/0816* (2024.01)

(52) U.S. Cl.
CPC ....... *H04W 72/23* (2023.01); *H04W 74/0816* (2013.01); *H04W 74/0866* (2013.01)

(58) Field of Classification Search
CPC ............... H04W 72/23; H04W 74/006; H04W 74/0816; H04W 74/0808; H04W 74/0866
See application file for complete search history.

(56) References Cited

U.S. PATENT DOCUMENTS

| 10,791,569 | B2 * | 9/2020 | Salem | H04W 16/14 |
| 11,324,016 | B2 * | 5/2022 | Sun | H04W 74/0816 |
| 11,638,224 | B2 * | 4/2023 | Myung | H04W 24/10 370/329 |
| 11,864,230 | B2 * | 1/2024 | Yang | H04W 74/006 |

(Continued)

FOREIGN PATENT DOCUMENTS

| CN | 105991272 A | * 10/2016 | ............ H04W 72/04 |
| CN | 107079494 A | 8/2017 | |

(Continued)

OTHER PUBLICATIONS

International Search Report and Written Opinion—PCT/CN2020/075017—ISA/EPO—Nov. 17, 2020.

(Continued)

*Primary Examiner* — Eric Nowlin
(74) *Attorney, Agent, or Firm* — Harrity & Harrity, LLP (57) ABSTRACT

Various aspects of the present disclosure generally relate to wireless communication. In some aspects, a user equipment (UE) may receive, from a base station, an uplink grant message in a first fixed frame period (FFP) in frame based equipment mode, and transmit data to the base station in a first part of a second FFP, based at least in part on information in the uplink grant message. Numerous other aspects are provided.

19 Claims, 10 Drawing Sheets

(56) References Cited

U.S. PATENT DOCUMENTS

| | | | |
|---|---|---|---|
| 12,058,734 B2 * | 8/2024 | Lu | H04W 72/04 |
| 12,108,445 B2 * | 10/2024 | Yang | H04W 72/23 |
| 2016/0192396 A1 * | 6/2016 | Ng | H04W 72/23 |
| | | | 370/329 |
| 2018/0103458 A1 | 4/2018 | Tooher et al. | |
| 2019/0075581 A1 * | 3/2019 | Salem | H04W 16/14 |
| 2019/0373636 A1 | 12/2019 | Yerramalli et al. | |
| 2020/0037336 A1 * | 1/2020 | Sun | H04W 74/0816 |
| 2021/0297969 A1 * | 9/2021 | Myung | H04W 74/0816 |
| 2021/0385863 A1 * | 12/2021 | Fan | H04W 74/002 |
| 2022/0110152 A1 * | 4/2022 | Lim | H04W 74/006 |
| 2022/0116995 A1 * | 4/2022 | Lu | H04W 72/04 |
| 2022/0132569 A1 * | 4/2022 | Salah | H04W 74/0833 |
| 2022/0210827 A1 * | 6/2022 | Wang | H04W 16/14 |
| 2022/0217708 A1 * | 7/2022 | Li | H04L 5/1469 |
| 2022/0272754 A1 * | 8/2022 | Lei | H04W 74/006 |
| 2022/0295558 A1 * | 9/2022 | Lei | H04L 5/001 |
| 2022/0304059 A1 * | 9/2022 | Lei | H04W 74/08 |
| 2023/0051760 A1 * | 2/2023 | Xu | H04W 74/0808 |
| 2023/0055275 A1 * | 2/2023 | Xu | H04W 74/0808 |
| 2023/0064829 A1 * | 3/2023 | Yang | H04W 72/23 |
| 2023/0156791 A1 * | 5/2023 | Yang | H04W 72/23 |
| | | | 370/329 |
| 2023/0189338 A1 * | 6/2023 | Singh | H04W 74/0816 |
| | | | 370/329 |
| 2023/0284273 A1 * | 9/2023 | Singh | H04W 24/08 |
| | | | 370/329 |
| 2024/0098781 A1 * | 3/2024 | Tsai | H04W 74/0808 |

FOREIGN PATENT DOCUMENTS

| | | | | |
|---|---|---|---|---|
| CN | 109314967 A | | 2/2019 | |
| CN | 113179675 A | * | 7/2021 | H04L 5/0048 |
| CN | 114982332 A | * | 8/2022 | H04W 74/0808 |
| CN | 114982332 B | * | 11/2024 | H04W 74/0808 |
| EP | 3836721 A1 | * | 6/2021 | H04L 5/0048 |
| EP | 4195855 A1 | * | 6/2023 | H04W 16/14 |
| EP | 3895497 B1 | * | 7/2024 | H04W 74/006 |
| KR | 20210029278 A | * | 3/2021 | |
| WO | WO-2016127648 A1 | * | 8/2016 | H04W 72/04 |
| WO | WO-2020023475 A1 | * | 1/2020 | H04W 16/14 |
| WO | 2020027533 A1 | | 2/2020 | |
| WO | WO-2020032725 A1 | * | 2/2020 | H04W 24/10 |
| WO | WO-2021214730 A1 | * | 10/2021 | H04W 74/0816 |
| WO | WO-2022030945 A1 | * | 2/2022 | H04W 16/14 |

OTHER PUBLICATIONS

Spreadtrum Communications: "Discussion on DL Signals and Channels for NR-U", 3GPP TSG RAN WG1 #99, R1-1912561, Nov. 22, 2019 (Nov. 22, 2019), 5 pages, section 2.1, 2.2.

Qualcomm Incorporated: "DL Signals and Channels for NR-U", R1-1912936, 3GPP TSG RAN WG1 Meeting #98bis, 3rd Generation Partnership Project, Mobile Competence Centre, 650, Route Des Lucioles, F-06921, Sophia-Antipolis, Cedex, France, vol. RAN WG1, No. Reno, Nevada, US, Nov. 18, 2019-Nov. 22, 2019, Nov. 9, 2019, XP051823699, pp. 1-16, Sections 5-8, paragraph [0006].

Supplementary European Search Report—EP20918485—Search Authority—The Hague—Oct. 4, 2023.

Spreadtrum Communications: "Discussion on DL Signals and Channels for NR-U", 3GPP TSG RAN WG1 #99, R1-1912561, Reno, USA, Nov. 18, 2019-Nov. 22, 2019, Nov. 8, 2019, 5 pages, Section 2.

* cited by examiner

TRANSMISSION OF UPLINK DATA AT START OF FIXED FRAME PERIOD IN FRAME BASED EQUIPMENT MODE

CROSS-REFERENCE TO RELATED APPLICATION

This application is a 371 national stage of PCT Application No. PCT/CN2020/075017 filed on Feb. 13, 2020, entitled "TRANSMISSION OF UPLINK DATA AT START OF FIXED FRAME PERIOD IN FRAME BASED EQUIPMENT MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmission of uplink data at a start of a fixed frame period in frame based equipment mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, an uplink grant message in a first fixed frame period (FFP) in frame based equipment (FBE) mode, and transmitting data to the base station in a first part of a second FFP, based at least in part on information in the uplink grant message.

In some aspects, a method of wireless communication, performed by a base station, may include transmitting an uplink grant message in an FFP to a UE in FBE mode, and receiving data from the UE in a first part of a second FFP, based at least in part on information in the uplink grant message.

In some aspects, a UE for wireless communication may include a memory and one or more processors operatively coupled to the memory. The memory and the one or more processors may be configured to receive, from a base station, an uplink grant message in a first FFP in FBE mode, and transmit data to the base station in a first part of a second FFP, based at least in part on information in the uplink grant message.

In some aspects, a base station for wireless communication may include a memory and one or more processors operatively coupled to the memory. The memory and the one or more processors may be configured to transmit an uplink grant message in an FFP to a UE in FBE mode, and receive data from the UE in a first part of a second FFP, based at least in part on information in the uplink grant message.

In some aspects, a non-transitory computer-readable medium may store one or more instructions for wireless communication. The one or more instructions, when executed by one or more processors of a UE, may cause the one or more processors to receive, from a base station, an uplink grant message in an FFP in FBE mode, and transmit data to the base station in a first part of a second FFP, based at least in part on information in the uplink grant message.

In some aspects, a non-transitory computer-readable medium may store one or more instructions for wireless communication. The one or more instructions, when executed by one or more processors of a base station, may cause the one or more processors to transmit an uplink grant message in an FFP to a user equipment UE in FBE mode, and receive data from the UE in a first part of a second FFP, based at least in part on information in the uplink grant message.

In some aspects, an apparatus for wireless communication may include means for receiving, from a base station, an uplink grant message in an FFP in FBE mode, and means for transmitting data to the base station in a first part of a second FFP, based at least in part on information in the uplink grant message.

In some aspects, an apparatus for wireless communication may include means for transmitting an uplink grant message in an FFP to a UE in FBE mode, and means for receiving data from the UE in a first part of a second FFP, based at least in part on information in the uplink grant message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. In some aspects, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
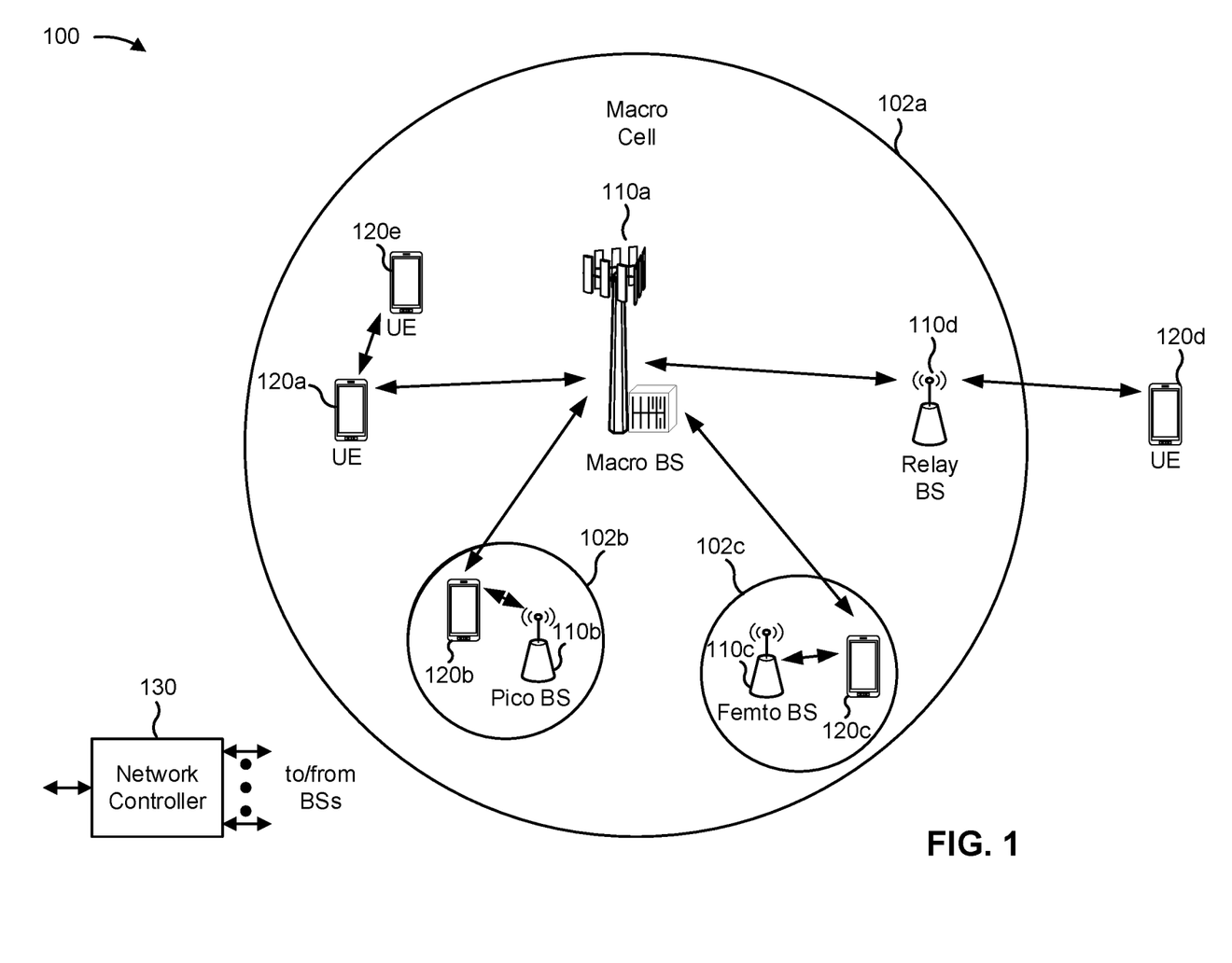
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. In some aspects, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, in some aspects, robots, drones, remote devices, sensors, meters, monitors, location tags, and/or the like, that may communicate with a base station, another device (e.g., remote device), or some other entity. A wireless node may provide, in some aspects, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. In some aspects, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). In some aspects, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
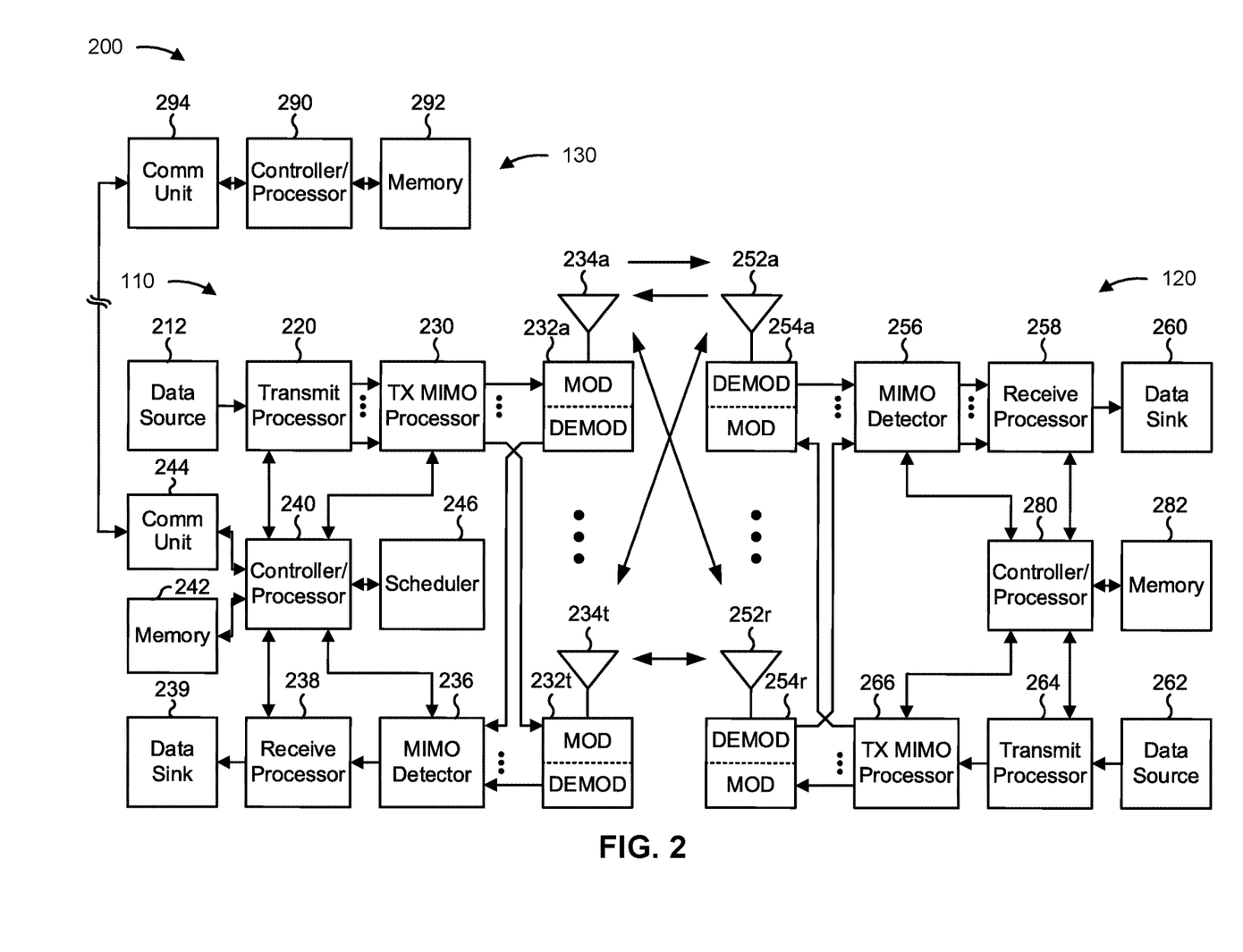
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission of uplink data at a start of a fixed frame period (FFP) in frame based equipment (FBE) mode, as described in more detail elsewhere herein. FBE mode may refer to a mode where fixed frames are used for transmission in an unlicensed spectrum. In some aspects, controller/processor 240 of base station 110, controller/processor 280 of UE 120, and/or any other component(s) of FIG. 2 may perform or direct operations of, in some aspects, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. In some aspects, the one or more instructions, when executed (e.g., directly, or after compiling, converting, interpreting, and/or the like) by one or more processors of the base station 110 and/or the UE 120, may perform or direct operations of, in some aspects, process 900 of FIG. 9, process 1000 of FIG. 10, and/or other processes as described herein. In some aspects, executing instructions may include running the instructions, converting the instructions, compiling the instructions, interpreting the instructions, and/or the like.

A scheduler 246 may schedule UEs for data transmission on the downlink and/or uplink.

In some aspects, UE 120 may include means for receiving, from a base station, an uplink grant message in a first FFP in FBE mode, means for transmitting data to the base station in a first part of a second FFP, based at least in part on information in the uplink grant message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an uplink grant message in a first FFP to a UE in FBE mode, means for receiving data from the UE in a first part of a second FFP, based at least in part on information in the uplink grant message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Transmissions on unlicensed carriers may require a transmitting device, such as a UE, to determine whether a carrier (frequency channel) is clear for transmission. Listen Before Talk (or Listen Before Transmit) (LBT) is a mechanism that a UE may use to sense whether a channel is clear (clear channel assessment). If a UE performs LBT on a channel and the channel is clear, this may be called an LBT success. If the UE performs LBT on the channel and the channel is not clear, this may be called an LBT failure.

Figure 3:
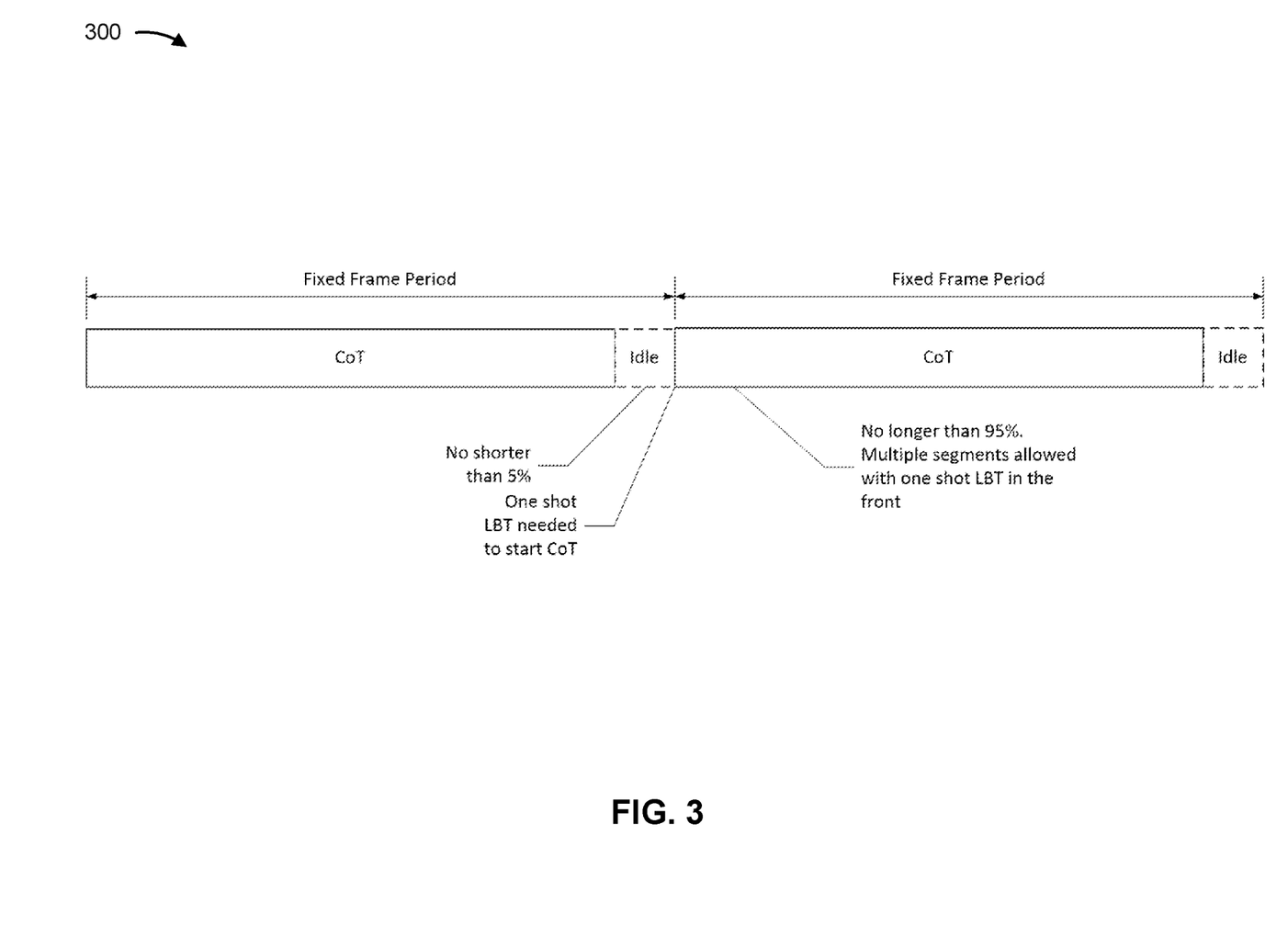
FIG. 3 illustrates an example of fixed frame periods (FFPs), in accordance with various aspects of the present disclosure.

FIG. 3 illustrates an example 300 of FFPs, in accordance with various aspects of the present disclosure.

FBE mode may include FFPs for communicating in unlicensed spectrum.

As shown in FIG. 3, an FFP, used by a base station (e.g., gNB), may have a channel occupancy time (COT) portion for transmitting downlink communications. The gNB may share the COT portion with a UE for receiving uplink communications. The FFP may have an idle period at an end of the FFP, after the COT, for performing an LBT procedure for the next FFP. The FFP may be 1 millisecond (ms), 2 ms, 2.5 ms, 4 ms, 5 ms, 10 ms, and/or the like (including the idle period). Starting positions of the FFPs within every two radio frames (e.g., even radio frames) may be given by i*P where i={0, 1, . . . , 20/P-1} and P is the FFP in ms. The idle period for a given subcarrier spacing (SCS) may be a ceiling value for a minimum idle period allowed by regulations divided by Ts, where the minimum idle period allowed=max (5% of FFP, 100 microseconds (µs)) and Ts is the symbol duration for the given SCS. The idle period may have no less than 5% of the FFP.

An FFP configuration for FBE may be included in a system information block (e.g., SIB-1) or signaled in UE-specific radio resource control (RRC) signaling. If the network indicates FBE operation for fallback downlink and uplink grants, for an indication of LBT type of Cat-2 (25 µs) or Cat-4, the UE may follow the mechanism whereby one 9 µs slot (e.g., one shot LBT) is measured within a 25 µs interval. UE transmissions within the FFP may occur if downlink signals or channels, such as a physical downlink control channel (PDCCH), a synchronization signal block, a physical broadcast channel, remaining minimum system information, a group common PDCCH, and/or the like, within the FFP are detected. A same 2-bit field in load based equipment (LBE) mode may be used or reinterpreted to indicate an FBE LBT type, a cyclic prefix extension, and/or a channel access priority class indication.

In Release 16 NR unlicensed (NR-U), only a base station (e.g., gNB) can act as an initiating device, and the UE may only act as a responding device. The channel access rules may thus be as follows. If the gNB initiates COT, Cat-1 LBT may not apply and the gNB may perform Cat-2 LBT right before an FFP. If the gNB is to transmit a downlink burst in gNB COT, the gNB may perform Cat-1 LBT if a gap from a previous downlink or uplink burst is within 16 µs, and perform Cat-2 LBT if the gap is more than 16 µs. If the UE initiates COT, Cat-1 LBT and Cat-2 LBT may not apply. If the UE is to transmit an uplink burst in a gNB COT, the UE may perform Cat-1 LBT if the gap is within 16 µs, and perform Cat-2 LBT if the gap is greater than 16 µs. Note the Cat-2 LBT for FBE may be different from Cat-2 LBT (25 µs or 16 µs) in LBE. In some aspects, one 9 µs measurement right before the transmission may be needed, with at least 4 µs for measurement. This may be referred to as a one-shot LBT.

As indicated above, FIG. 3 is provided as an example. Other examples may differ from what is described with regard to FIG. 3.

Unlicensed frequency spectrum may be used for ultra-reliable low-latency communication (URLLC) and industrial internet of things (IIoT) applications that involve a controlled environment. A controlled environment may be an environment that is controlled such that there will be no other radio access technology (RAT) or other operators operating in the coverage area. An LBT procedure may thus always pass, even if performed for an FBE device. More generally, even though a factory owner or operator can clear the environment, there may still be a chance that some other RAT is operating. In some aspects, for a Wi-Fi device, an access probe may be transmitted from a station even when the access point is not deployed. The factory can enforce a rule that no Wi-Fi access points are to be deployed in the factory floor, but it may be hard to make sure that no employee brings in a smart phone. Thus, there is a small chance that a gNB LBT procedure may fail.

If a UE in FBE mode (where LBT is to be performed) has uplink data to transmit but there is no downlink data for the gNB to transmit, or if the gNB fails an LBT procedure, the UE may not transmit its uplink data. If the gNB LBT passes, the UE may wait until after a COT indicator processing time (in a first part of the FFP) before transmitting data. That is, the UE either does not transmit its data (causing a service interruption) or wastes time before transmitting data.

According to various aspects described herein, a UE may transmit uplink data during a COT indicator processing time such that time resources of an FFP are not wasted. If the UE is able to transmit uplink data during the FFP and not wait until a later FFP, services may not be interrupted. The UE may transmit the uplink data in a first part of the FFP based at least in part on grant information received during a previous FFP. The first part may be one or more OFDM symbols, depending on a category of the UE. The UE may not have to rely on receiving a COT indicator from a successful LBT by the gNB. If the gNB LBT procedure is successful, the UE may not have to wait until after the COT processing time to transmit data. The UE may thus avoid service interruption and not waste time resources.

Figure 4:
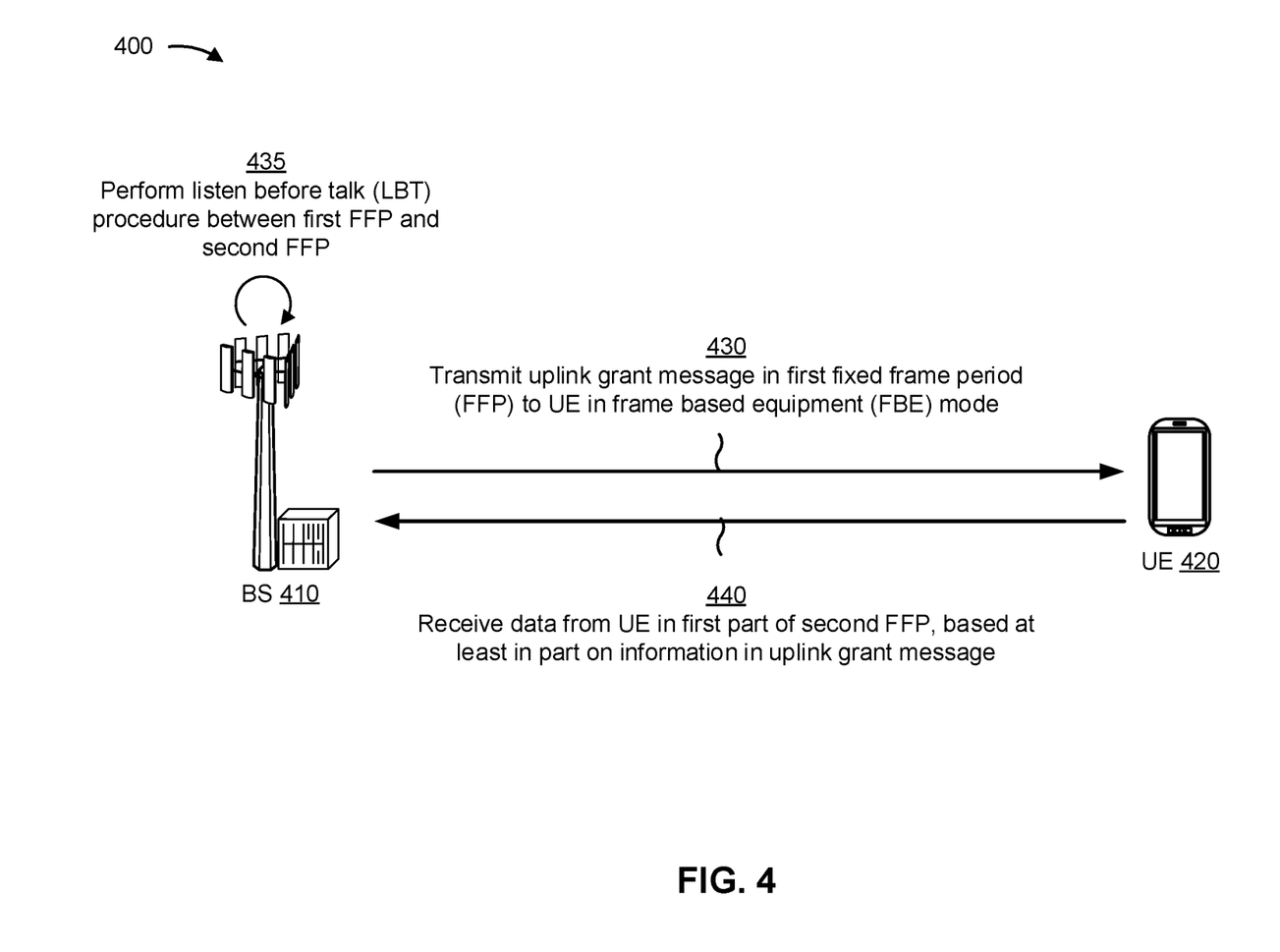
FIG. 4 illustrates an example of transmission of uplink data at a start of an FFP in frame based equipment (FBE) mode, in accordance with various aspects of the present disclosure.

FIG. 4 illustrates an example 400 of transmission of uplink data at a start of an FFP in FBE mode, in accordance with various aspects of the present disclosure. FIG. 4 shows a base station (BS) 410 (e.g., BS 110 depicted in FIGS. 1 and 2) and a UE 420 (e.g., UE 120 depicted in FIGS. 1 and 2) that may communicate with each other. FIG. 4 shows operations from a perspective of BS 410.

As shown by reference number 430, BS 410 may transmit an uplink grant message in a first FFP to UE 420 in FBE mode. As shown by reference number 435, BS 410 may optionally perform an LBT procedure in an idle period at an end of the first FFP and before a second FFP. The UE may transmit uplink data in a first part of the second FFP based at least in part on the uplink grant message, rather than as a result of the LBT procedure by BS 410. Accordingly, as shown by reference number 440, BS 410 may receive data from UE 420 in the first part of the second FFP.

As indicated above, FIG. 4 is provided as an example. Other examples may differ from what is described with regard to FIG. 4.

Figure 5:
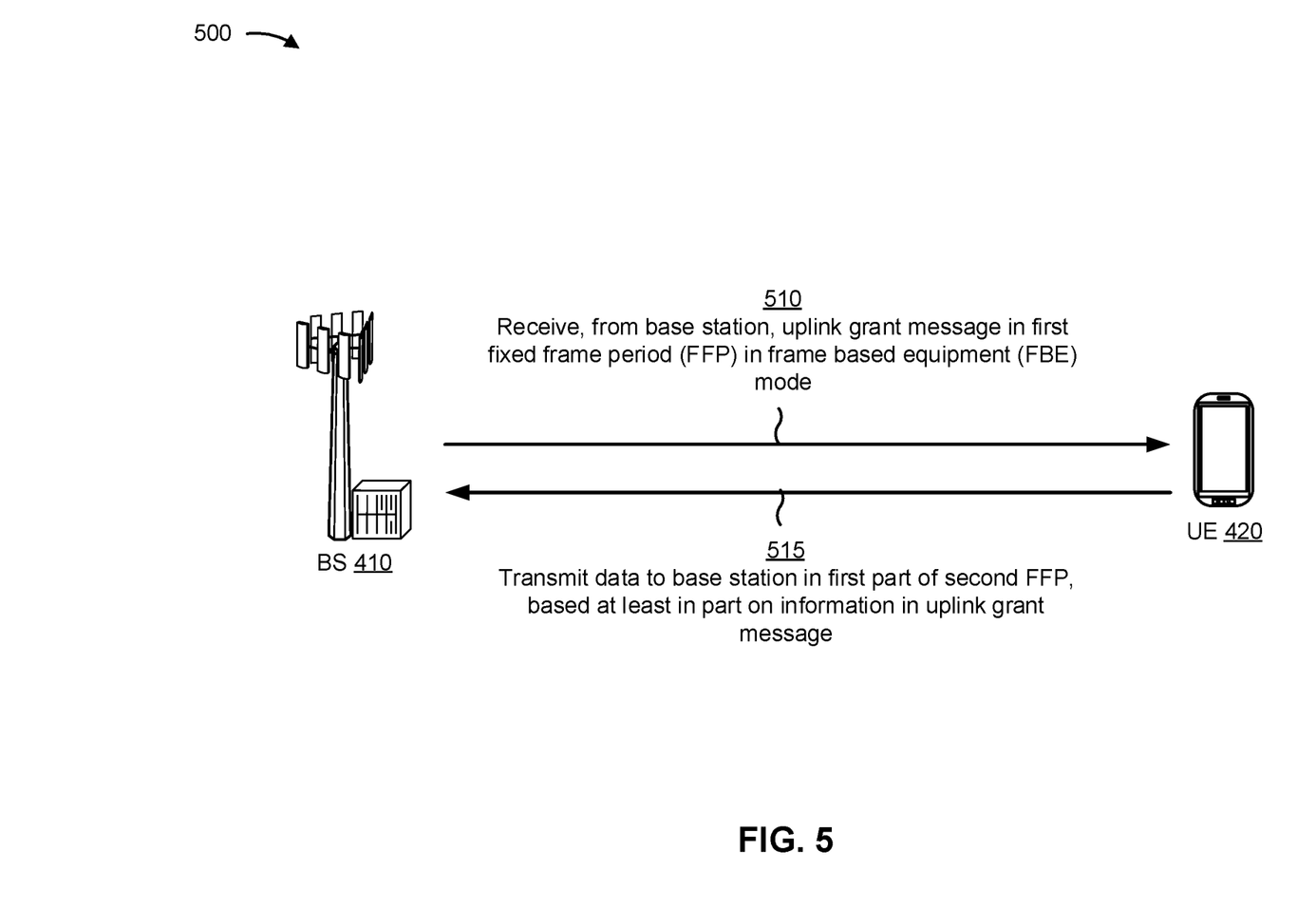
FIG. 5 illustrates an example of transmission of uplink data at a start of an FFP in FBE mode, in accordance with various aspects of the present disclosure.

FIG. 5 illustrates an example 500 of transmission of uplink data at a start of an FFP in FBE mode, in accordance with various aspects of the present disclosure. FIG. 5 shows operations from a perspective of UE 420.

As shown by reference number 510, BS 410 may transmit the uplink grant message in the first FFP to UE 420. As shown by reference number 515, UE 420 may transmit uplink data in the first part of the second FFP based at least in part on the uplink grant message. UE 420 may transmit the uplink data whether the LBT procedure by BS 410 passes or fails. If the LBT procedure passes, UE 420 may receive a COT indicator in the second FFP, and the first part of the second FFP may be a time period during the second FFP for UE 420 to process the COT indicator. If the LBT procedure fails, there may be no COT indicator. UE 420 may transmit uplink data at a start of the second FFP, or shortly thereafter. Before UE 420 transmits the uplink data, UE 420 may perform a one shot LBT procedure, which may take only 9 µs. UE 420 may transmit uplink data based at least in part on a determination that the one shot LBT procedure passes.

As indicated above, FIG. 5 is provided as an example. Other examples may differ from what is described with regard to FIG. 5.

Figure 6:
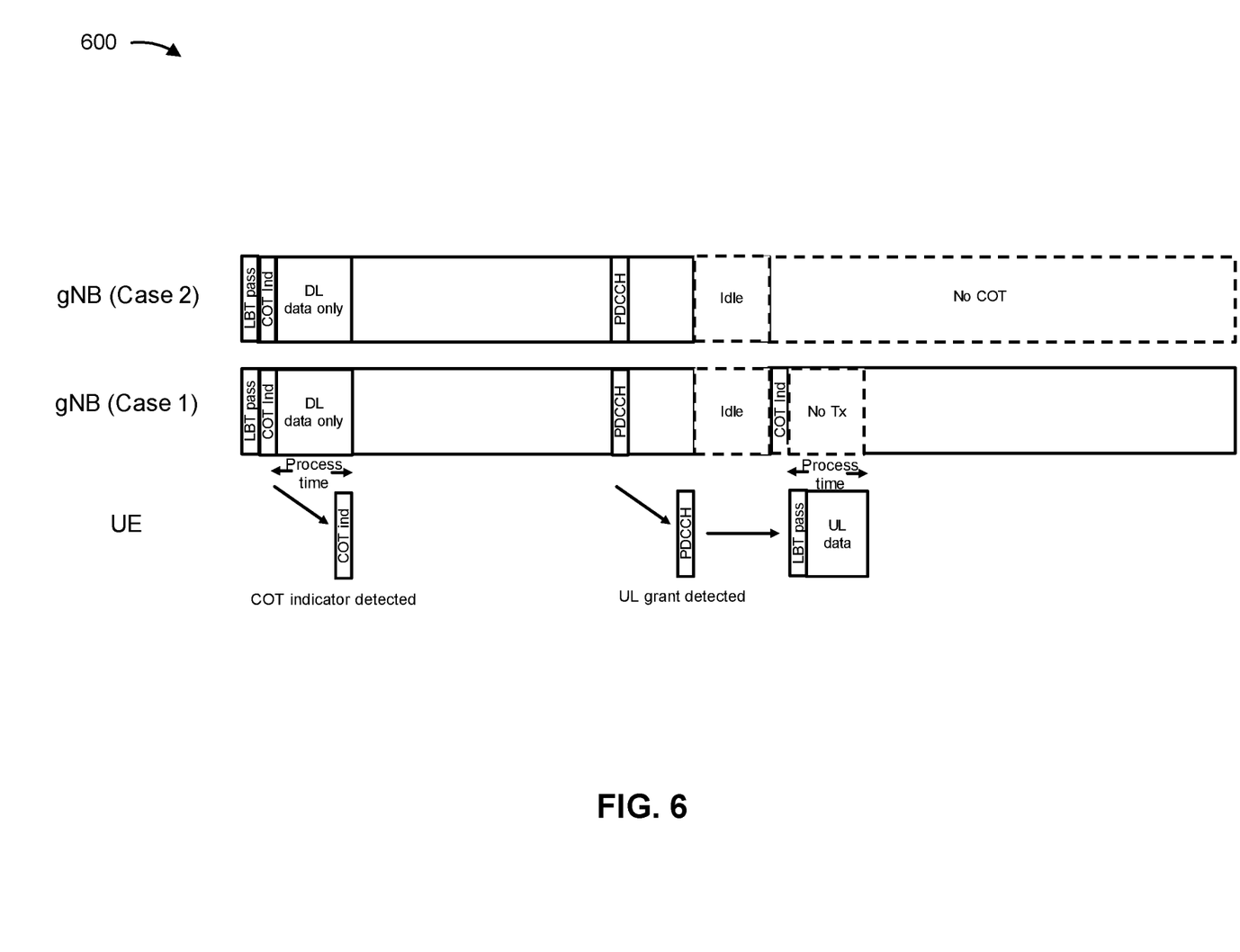
FIG. 6 illustrates an example of transmission of uplink data at a start of an FFP in FBE mode, in accordance with various aspects of the present disclosure.

FIG. 6 illustrates an example 600 of transmission of uplink data at a start of an FFP in FBE mode, in accordance with various aspects of the present disclosure. FIG. 6 shows a timeline for a gNB (e.g., BS 410) and a UE (e.g., UE 420).

FIG. 6 shows a gNB in a first case, (Case 1) where the LBT procedure for the gNB passes. The gNB may process the COT indicator to transmit to the UE. The UE may transmit the uplink data during a time for processing the COT indicator, based at least in part on the uplink grant message that is received on the PDCCH. The gNB may transmit the uplink grant message in a last slot of the first FFP. The uplink grant message may be part of dynamic scheduling for the UE. FIG. 6 shows that the UE may perform a short LBT procedure before transmitting the uplink data. This may lead to low latency for the uplink data, and there may be no impact on other UEs.

FIG. 6 also shows the gNB for a second case (Case 2), where the LBT procedure for the gNB fails. Normally, there would be no COT sharing for the second FFP and the UE would not transmit uplink data. However, because the UE is basing transmission of uplink data at least in part on the uplink grant message, rather than on the LBT procedure by the gNB, the UE may still transmit uplink data in a first part of the second FFP even if the LBT procedure of the gNB fails.

As indicated above, FIG. 6 is provided as an example. Other examples may differ from what is described with regard to FIG. 6.

Figure 7:
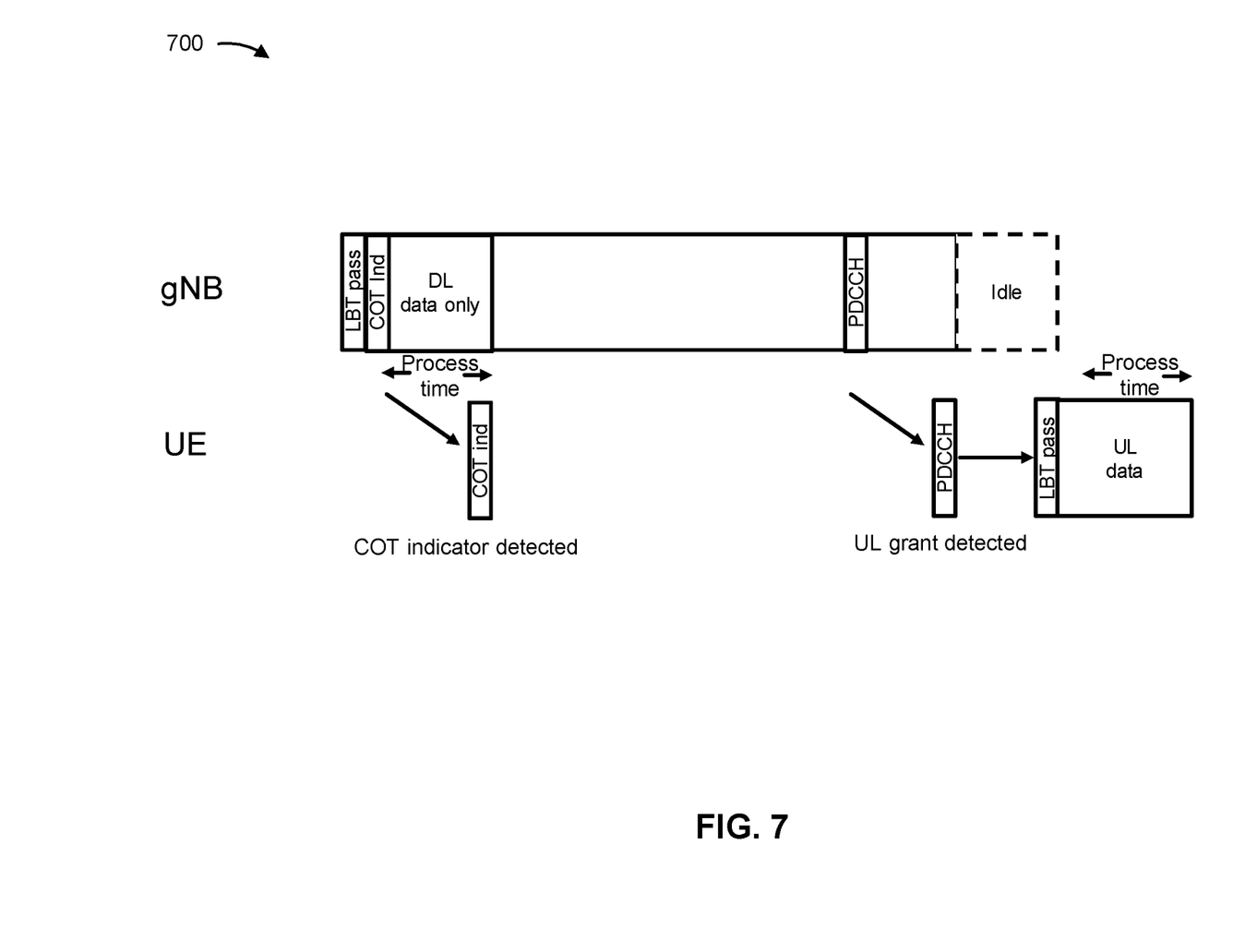
FIG. 7 illustrates an example of transmission of uplink data at a start of an FFP in FBE mode, in accordance with various aspects of the present disclosure.

FIG. 7 illustrates an example 700 of transmission of uplink data at a start of an FFP in FBE mode, in accordance with various aspects of the present disclosure. FIG. 7 shows a timeline for a gNB (e.g., BS 410) and a UE (e.g., UE 420).

FIG. 7 shows that the gNB may not perform an LBT procedure before the second FFP at all. The gNB may indicate to the UE that the gNB will not contend for the second FFP. The UE may transmit the uplink data at a start of the second FFP, based at least in part on the indication that the gNB will not contend for the second FFP. The gNB may include the indication in a group common PDCCH (GC-PDCCH) message in a last slot of the first FFP. FIG. 7 shows that the UE may perform a short LBT procedure before transmitting the uplink data. The LBT procedure by the UE may be before the start of the second FFP.

As indicated above, FIG. 7 is provided as an example. Other examples may differ from what is described with regard to FIG. 7.

Figure 8:
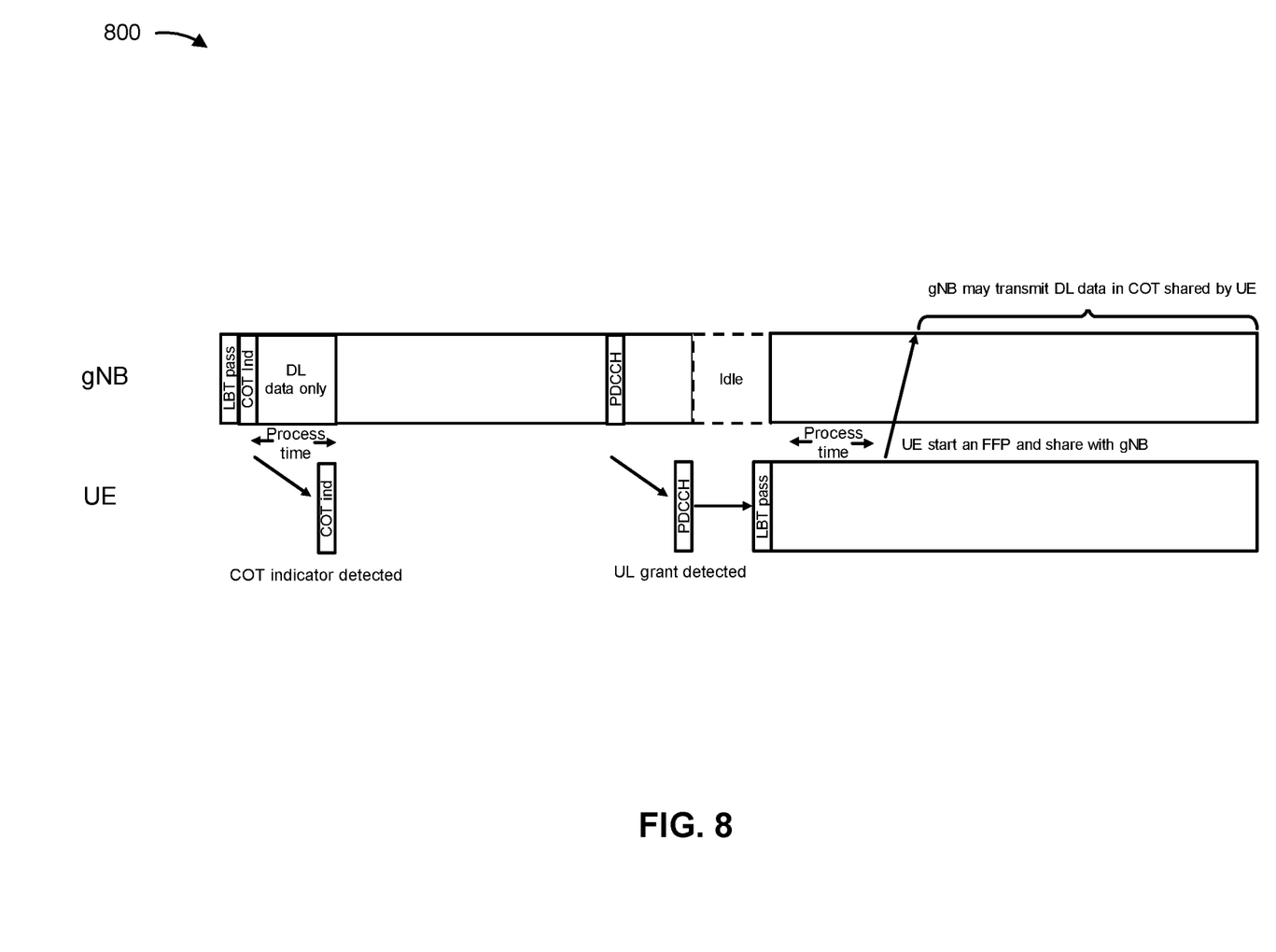
FIG. 8 illustrates an example of transmission of uplink data at a start of an FFP in FBE mode, in accordance with various aspects of the present disclosure.

FIG. 8 illustrates an example 800 of transmission of uplink data at a start of an FFP in FBE mode, in accordance with various aspects of the present disclosure. FIG. 8 shows a timeline for a gNB (e.g., BS 410) and a UE (e.g., UE 420).

FIG. 8 shows that the UE may transmit the uplink data at a start of the second FFP, based at least in part on an uplink grant message received from the gNB in the first FFP. The gNB may indicate in a GC-PDCCH message that the gNB will not contend for the second FFP. FIG. 8 shows that the UE may transmit a COT indicator to the gNB, indicating that the gNB may share the COT with the UE. The gNB may transmit downlink data in the COT shared with the UE.

As indicated above, FIG. 8 is provided as an example. Other examples may differ from what is described with regard to FIG. 8.

Figure 9:
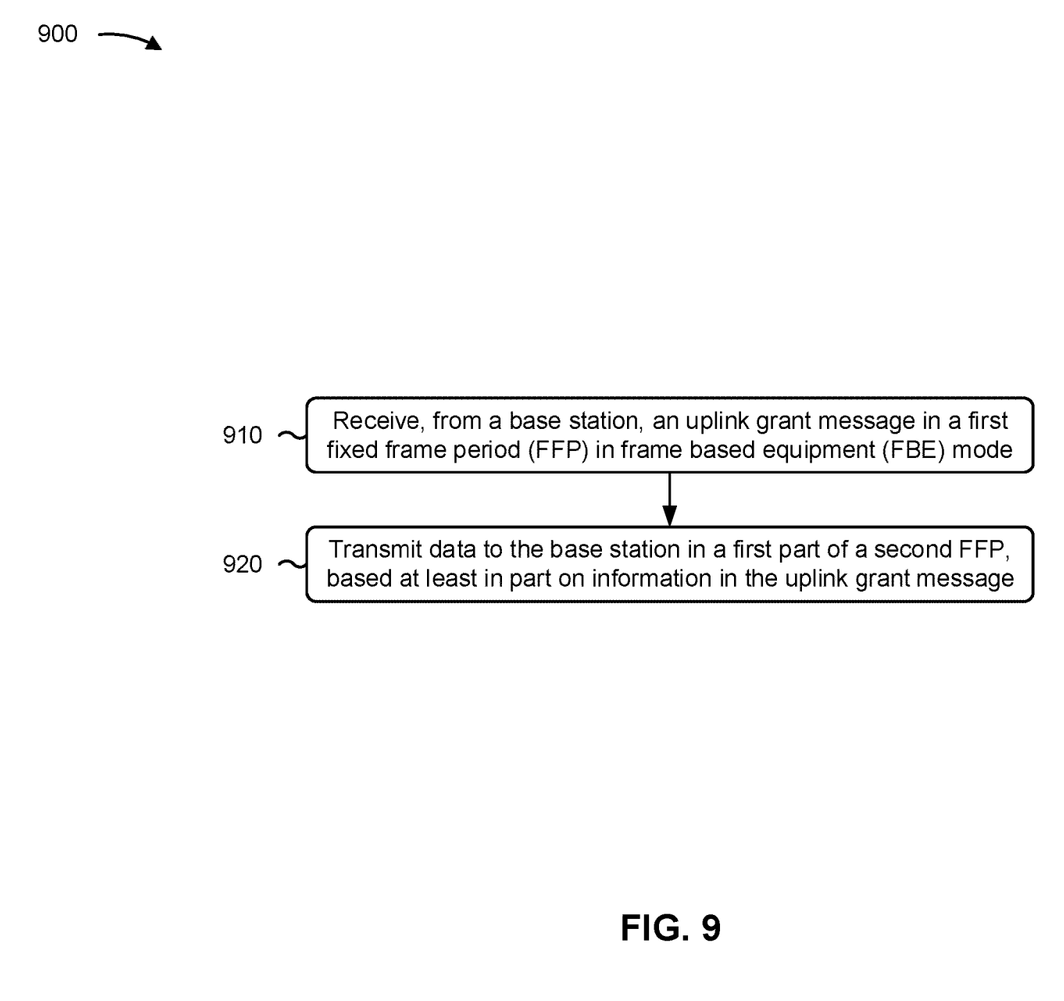
FIG. 9 is a diagram illustrating an example process performed, in some aspects, by a UE, in accordance with various aspects of the present disclosure.

FIG. 9 is a diagram illustrating an example process 900 performed, in some aspects, by a UE, in accordance with various aspects of the present disclosure. Example process 900 is an example where the UE (e.g., 120 depicted in FIGS. 1 and 2, UE 420 depicted in FIGS. 4 and 5, and/or the like) performs operations associated with transmission of uplink data at a start of an FFP in FBE mode.

As shown in FIG. 9, in some aspects, process 900 may include receiving, from a base station, an uplink grant message in an FFP in FBE mode (block 910). In some aspects, the UE (e.g., using receive processor 258, transmit processor 264, controller/processor 280, memory 282, and/or the like) may receive, from a base station, an uplink grant message in an FFP in FBE mode, as described above.

As further shown in FIG. 9, in some aspects, process 900 may include transmitting data to the base station in a first part of a second FFP, based at least in part on information in the uplink grant message (block 920). In some aspects, the UE (e.g., using receive processor 258, transmit processor 264, controller/processor 280, memory 282, and/or the like) may transmit data to the base station in a first part of a second FFP, based at least in part on information in the uplink grant message, as described above.

Process 900 may include additional aspects, such as any single aspect or any combination of aspects described below and/or in connection with one or more other processes described elsewhere herein.

In a first aspect, the first part of the second FFP is during a processing time for the UE to decode a COT indicator.

In a second aspect, alone or in combination with the first aspect, the first part of the second FFP is a first one or more symbols of the second FFP.

In a third aspect, alone or in combination with one or more of the first and second aspects, transmitting data to the base station includes transmitting data to the base station based at least in part on receiving a common downlink control message that indicates that the base station will not contend for the second FFP.

In a fourth aspect, alone or in combination with one or more of the first through third aspects, receiving the uplink grant message includes receiving the uplink grant message in a last slot of the first FFP.

In a fifth aspect, alone or in combination with one or more of the first through fourth aspects, process 900 includes comprising receiving a COT indicator from the base station, and transmitting data to the base station based at least in part on the COT indicator.

In a sixth aspect, alone or in combination with one or more of the first through fifth aspects, transmitting data to the base station includes performing an LBT procedure and transmitting data to the base station based at least in part on a determination that the LBT procedure is successful.

In a seventh aspect, alone or in combination with one or more of the first through sixth aspects, performing the LBT procedure includes performing the LBT procedure in an idle period of the first FFP and before the second FFP.

In an eighth aspect, alone or in combination with one or more of the first through seventh aspects, process 900 includes generating a channel occupancy time (COT) indicator based at least in part on a determination that the LBT procedure is successful, and transmitting the COT indicator to the base station.

In a ninth aspect, alone or in combination with one or more of the first through eighth aspects, process 900 includes receiving data from the base station in the second FFP, based at least in part on transmitting the COT indicator to the base station Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
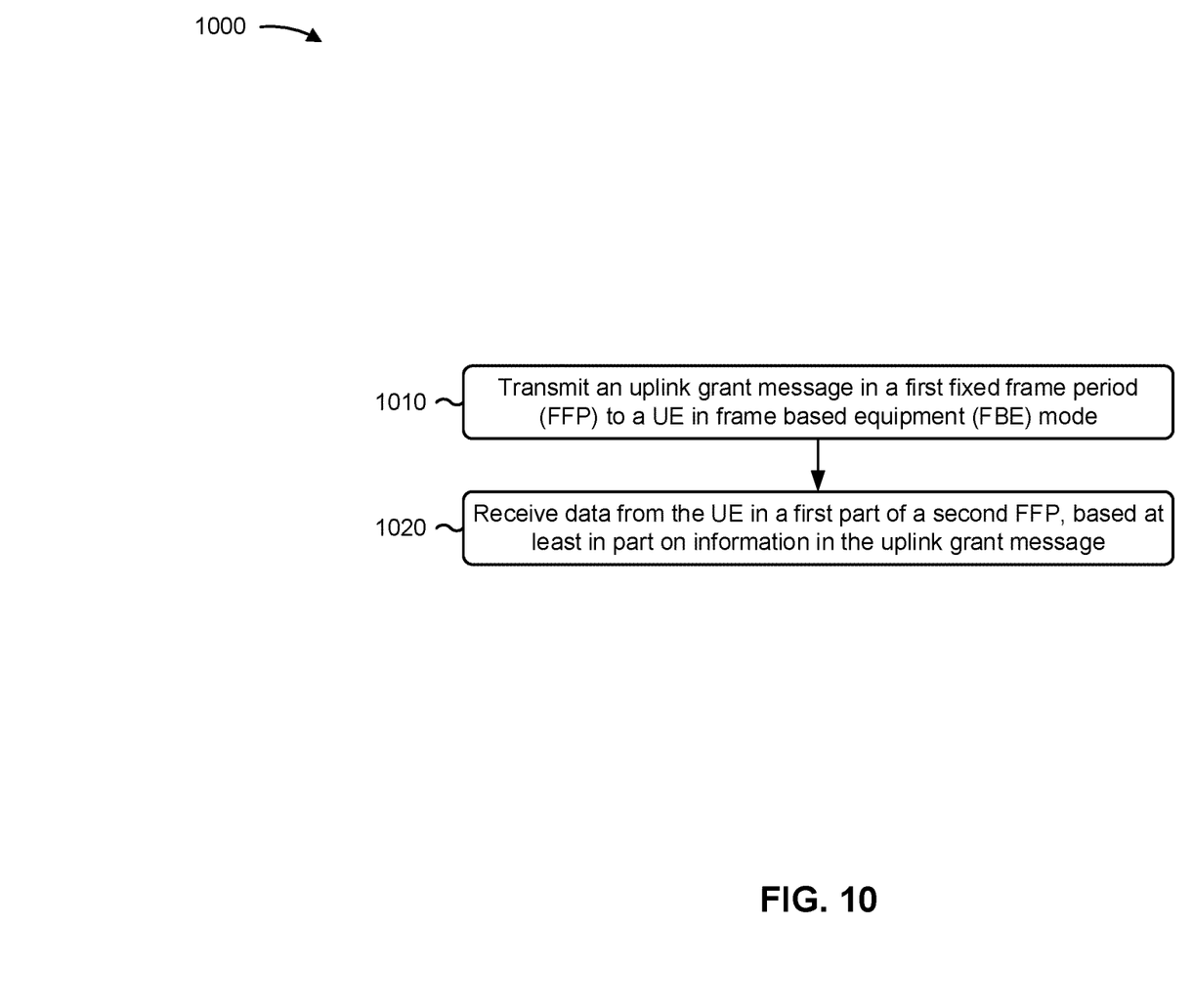
FIG. 10 is a diagram illustrating an example process performed, in some aspects, by a base station, in accordance with various aspects of the present disclosure.

FIG. 10 is a diagram illustrating an example process 1000 performed, in some aspects, by a base station, in accordance with various aspects of the present disclosure. Example process 1000 is an example where the base station (e.g., BS 110 depicted in FIGS. 1 and 2, BS 410 depicted in FIGS. 4 and 5, and/or the like) performs operations associated with transmission of uplink data at a start of an FFP in FBE mode.

As shown in FIG. 10, in some aspects, process 1000 may include transmitting an uplink grant message in an FFP to a UE in FBE mode (block 1010). In some aspects, the base station (e.g., using transmit processor 220, receive processor 238, controller/processor 240, memory 242, and/or the like) may transmit an uplink grant message in an FFP to a UE in FBE mode, as described above.

As further shown in FIG. 10, in some aspects, process 1000 may include receiving data from the UE in a first part of a second FFP, based at least in part on information in the uplink grant message (block 1020). In some aspects, the base station (e.g., using transmit processor 220, receive processor 238, controller/processor 240, memory 242, and/or the like) may receive data from the UE in a first part of a second FFP, based at least in part on information in the uplink grant message, as described above.

Process 1000 may include additional aspects, such as any single aspect or any combination of aspects described below and/or in connection with one or more other processes described elsewhere herein.

In a first aspect, transmitting the uplink grant message includes transmitting the uplink grant message in a last slot of the first FFP.

In a second aspect, alone or in combination with the first aspect, process 1000 includes performing an LBT procedure in an idle period of the first FFP and before the second FFP, and receiving data from the UE in the first part of the second FFP based at least in part on a determination that the LBT procedure is successful, where the first part of the FFP is including a processing time for decoding a COT indicator of the base station.

In a third aspect, alone or in combination with one or more of the first and second aspects, process 1000 includes performing an LBT procedure in an idle period of the first FFP and before the second FFP, and receiving data from the UE in the first part of the second FFP based at least in part on a determination that the LBT procedure is not successful.

In a fourth aspect, alone or in combination with one or more of the first through third aspects, the first part of the second FFP is a first one or more symbols of the second FFP.

In a fifth aspect, alone or in combination with one or more of the first through fourth aspects, process 1000 includes refraining from performing an LBT procedure in an idle period at an end of the first FFP and before the second FFP, and transmitting a common downlink control message that indicates that the base station will not contend for the second FFP.

In a sixth aspect, alone or in combination with one or more of the first through fifth aspects, process 1000 includes transmitting data to the UE based at least in part on receiving a COT indicator from the UE.

In a seventh aspect, alone or in combination with one or more of the first through sixth aspects, the UE is a first UE, and process 1000 further comprises receiving data from a second UE in the first part of the second FFP, and transmitting data to the second UE based at least in part on receiving a COT indicator from the second UE, where the first UE and the second UE share a COT with the base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a base station, an uplink grant message in a first fixed frame period (FFP) in frame based equipment (FBE) mode; and transmitting data to the base station in a first part of a second FFP, based at least in part on information in the uplink grant message,
wherein the first part of the second FFP is during a processing time for the UE to decode a channel occupancy time (COT) indicator.

2. The method of claim 1, wherein the first part of the second FFP is a first one or more symbols of the second FFP.

3. The method of claim 1, wherein said transmitting data to the base station includes transmitting data to the base station based at least in part on receiving a common downlink control message that indicates that the base station will not contend for the second FFP.

4. The method of claim 1, wherein said receiving the uplink grant message includes receiving the uplink grant message in a last slot of the first FFP.

5. The method of claim 1, further comprising receiving the COT indicator from the base station and transmitting said data to the base station based at least in part on the COT indicator.

6. The method of claim 1, wherein said transmitting data to the base station includes performing a listen before talk (LBT) procedure and transmitting data to the base station based at least in part on a determination that the LBT procedure is successful.

7. The method of claim 6, wherein said performing the LBT procedure includes performing the LBT procedure in an idle period of the first FFP and before the second FFP.

8. A method of wireless communication performed by a base station, comprising:
transmitting an uplink grant message in a first fixed frame period (FFP) to a user equipment (UE) in frame based equipment (FBE) mode;
receiving data from the UE in a first part of a second FFP, based at least in part on information in the uplink grant message;
performing a listen before talk (LBT) procedure in an idle period of the first FFP and before the second FFP; and
receiving data from the UE in the first part of the second FFP based at least in part on a determination that the LBT procedure is successful, wherein the first part of the FFP includes a processing time for decoding a channel occupancy time (COT) indicator of the base station.

9. The method of claim 8, wherein said transmitting the uplink grant message includes transmitting the uplink grant message in a last slot of the first FFP.

10. The method of claim 8, wherein the first part of the second FFP is a first one or more symbols of the second FFP.

11. A user equipment (UE) for wireless communication, comprising:
a memory; and
one or more processors coupled to the memory, the memory and the one or more processors configured to:
receive, from a base station, an uplink grant message in a first fixed frame period (FFP) in frame based equipment (FBE) mode; and
transmit data to the base station in a first part of a second FFP, based at least in part on information in the uplink grant message,
wherein the first part of the second FFP is during a processing time for the UE to decode a channel occupancy time (COT) indicator.

12. The UE of claim 11, wherein the first part of the second FFP is a first one or more symbols of the second FFP.

13. The UE of claim 11, wherein the memory and the one or more processors are configured to transmit said data to the base station based at least in part on receiving a common downlink control message that indicates that the base station will not contend for the second FFP.

14. The UE of claim 11, wherein the memory and the one or more processors are configured to receive the uplink grant message in a last slot of the first FFP.

15. The UE of claim 11, wherein the memory and the one or more processors are configured to receive the COT indicator from the base station and transmit said data to the base station based at least in part on the COT indicator.

16. The UE of claim 11, wherein the memory and the one or more processors are configured to perform a listen before talk (LBT) procedure and transmit data to the base station based at least in part on a determination that the LBT procedure is successful.

17. The UE of claim 16, wherein the memory and the one or more processors are configured to perform the LBT procedure in an idle period of the first FFP and before the second FFP.

18. A base station for wireless communication, comprising:
a memory; and
one or more processors coupled to the memory, the memory and the one or more processors configured to:
transmit an uplink grant message in a first fixed frame period (FFP) to a user equipment (UE) in frame based equipment (FBE) mode;
receive data from the UE in a first part of a second FFP, based at least in part on information in the uplink grant message;
perform a listen before talk (LBT) procedure in an idle period of the first FFP and before the second FFP; and
receive data from the UE in the first part of the second FFP based at least in part on a determination that the LBT procedure is successful, wherein the first part of the FFP includes a processing time for decoding a channel occupancy time (COT) indicator of the base station.

19. An apparatus for wireless communication, comprising:
means for receiving, from a base station, an uplink grant message in a first fixed frame period (FFP) in frame based equipment (FBE) mode; and
means for transmitting data to the base station in a first part of a second FFP, based at least in part on information in the uplink grant message,
wherein the first part of the second FFP is during a processing time for the UE to decode a channel occupancy time (COT) indicator.

* * * * *